United States Patent
Jung

(10) Patent No.: US 11,458,804 B2
(45) Date of Patent: Oct. 4, 2022

(54) AIR CONDITIONER CUT CONTROL SYSTEM AND METHOD THEREOF

(71) Applicants: Hyundai Motor Company, Seoul (KR); Kia Motors Corporation, Seoul (KR)

(72) Inventor: Tae Hun Jung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 638 days.

(21) Appl. No.: 16/440,009

(22) Filed: Jun. 13, 2019

(65) Prior Publication Data

US 2020/0180397 A1 Jun. 11, 2020

(30) Foreign Application Priority Data

Dec. 7, 2018 (KR) .................. 10-2018-0157489

(51) Int. Cl.
*B60H 1/00* (2006.01)
*B60T 17/22* (2006.01)

(52) U.S. Cl.
CPC ........ *B60H 1/00764* (2013.01); *B60T 17/221* (2013.01); *B60T 2270/413* (2013.01)

(58) Field of Classification Search
CPC .......................... B60H 1/00764; B60H 1/3208; B60H 1/3225; B60H 1/00642; B60H 2001/3266; B60T 17/221; B60T 2270/413; B60T 17/22; B60T 8/17; B60T 8/245; B60T 8/321; B60T 13/40
See application file for complete search history.

(56) References Cited

U.S. PATENT DOCUMENTS

2004/0232861 A1* 11/2004 Wakashiro ............ B60W 10/24
318/139

FOREIGN PATENT DOCUMENTS

| JP | 3787223 B2 | * | 6/2006 | |
| JP | 2011016499 A | * | 1/2011 | |
| JP | 2015010547 A | * | 1/2015 | |
| WO | WO-2011162382 A1 | * | 12/2011 | .............. B60T 17/02 |
| WO | WO-2018211581 A1 | * | 11/2018 | ...... B60W 30/18181 |

* cited by examiner

*Primary Examiner* — Ramsey Refai
(74) *Attorney, Agent, or Firm* — Morgan, Lewis & Bockius LLP

(57) ABSTRACT

An air conditioner cut control system may include a driving condition detection unit detecting operation conditions of a vehicle, an air conditioner controller configured of determining an intake manifold negative pressure stored in a brake booster at a value obtained by subtracting intake manifold pressure from an atmospheric pressure detected by the driving condition detection unit when the air conditioner is operated and an engine control unit (ECU) for integrating the intake manifold negative pressure according to a brake negative pressure prediction logic and determining a virtual brake booster sensor value by modeling change of booster negative pressure according to driving information, and the ECU, and if the virtual brake booster sensor value is below a reference negative pressure of an A/C CUT standard logic, the ECU determines that brake negative pressure is insufficient and activates A/C CUT.

17 Claims, 9 Drawing Sheets

FIG. 4

MAP_1 < Virtual brake booster sensor decompression rate control map(hPa/s) >

| | Vehicle deceleration (speed change rate; m/s$^2$) | | | | | | |
|---|---|---|---|---|---|---|---|
| | under 0.1 | 0.1 or more to under 0.5 | 0.5 or more to under 1.0 | 1.0 or more to under 1.5 | 1.5 or more to under 2.0 | 2.0 or more |
| Intake manifold negative pressure (hPa) | under 50 | 30 | 35 | 40 | 45 | 55 | 65 |
| | 50 or more to under 100 | 25 | 30 | 35 | 40 | 50 | 60 |
| | 100 or more to under 150 | 20 | 25 | 30 | 35 | 45 | 55 |
| | 150 or more to under 200 | 15 | 20 | 25 | 30 | 40 | 50 |
| | 200 or more to under 250 | 10 | 15 | 20 | 25 | 35 | 45 |
| | 250 or more | 5 | 10 | 15 | 20 | 30 | 40 |

FIG. 5

MAP_2 < A / C CUT standard logic according to insufficient brake negative pressure >

| Division | Brake Signal | Altitude | Gear shift | Reference negative pressure (hPa) | Vehicle speed (Kph) | Recognized vehicle speed (Kph) | Idle (APS=0) | Monitoring time | Delay time | A/C off time | Prohibition of reentry | Note |
|---|---|---|---|---|---|---|---|---|---|---|---|---|
| Operation | ON | Unrelated | D/R | 266↓ | 0.1~10.0 | 0.4↓ | ON | 0.0 | 0.0 | 5 sec | Non | AND condition |
| Release | ON→OFF | Unrelated | D/R | 240↓ | 0.0~10.0 | 0.4↓ | ON | 0.0 | 0.8 | 5 sec | Non | AND condition |

AIR CONDITIONER CUT CONTROL SYSTEM AND METHOD THEREOF

CROSS-REFERENCE TO RELATED APPLICATION

The present application claims priority to Korean Patent Application No. 10-2018-0157489 filed on Dec. 7, 2018, the entire contents of which is incorporated herein for all purposes by this reference.

BACKGROUND OF THE INVENTION

Field of the Invention

The present invention relates to an air conditioner cut control system and a method thereof, and more particularly, to an air conditioner cut control system and method for reducing the frequency of an A/C cut in which an air conditioner operation of a vehicle is stopped.

Description of Related Art

In the conventional vehicle, when a brake negative pressure stored in a brake booster is insufficient, a brake pedal becomes hard, and a risk of accidents becomes high. To solve the present problem, logic that restores the brake negative pressure by stopping the operation of auxiliary devices such as an air conditioner (A/C) is applied in the situation where the brake negative pressure is insufficient.

For example, a compressor applied to an air conditioner affects the engine load during operation and when the negative pressure of the brake is lowered, a problem arises in brake operation. Therefore, when the negative pressure of the brake drops below a predetermined value, the demand power is controlled to be secured by stopping operation of the air conditioner (hereinafter referred to as "A/C cut").

Here, the brake negative pressure means a value directly measured by a sensor disposed in a brake booster. However, due to problems such as rising costs, in many manufacturers applies a pressure difference between atmospheric pressure and intake manifold pressure (hereinafter the pressure difference will be referred to as "intake manifold negative pressure"), which is the main factor for making the booster negative pressure instead of mounting the sensor in the actual brake booster.

FIG. 1 is a conceptual view showing an A/C CUT logic using a conventional intake manifold negative pressure.

Referring to FIG. 1, in a conventional A/C CUT logic using the intake manifold negative pressure A/C CUT is activated when the intake manifold negative pressure drops below a certain value irrespective of the altitude (e.g., more than 1500 m), and gradient conditions, and other vehicle driving conditions.

However, the intake manifold negative pressure has the side effect of causing a frequent A/C CUT in the characteristic using the value determined from the difference between the atmospheric pressure and the intake manifold pressure and not the actual measured value directly through the sensor. For example, despite the fact that enough negative pressure is stored in the actual brake booster, the difference between the atmospheric pressure and the intake manifold pressure is small, resulting in the side effect of activating A/C CUT. These side effects cause unnecessarily frequent A/C CUT, leading to cooling performance deteriorated and moisture generation in windshields, which causes customer complaints.

Furthermore, when the intake manifold negative pressure is higher than A/C CUT reference pressure, frequent A/C CUT occurs to deteriorate the cooling performance. Conversely, when the intake manifold negative pressure is lower than the reference pressure, A/C CUT frequency decreases but the braking performance deteriorated, so that there is a trade-off problem in which customer complaints arise in accordance with the customer's satisfaction.

Therefore, there is a desperate need to solve the trade-off problem of cooling performance and braking performance in A/C CUT control logic using conventional intake manifold negative pressure.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an air conditioner cut control system and a method thereof having advantages of predicting a virtual brake booster sensor value by integrating a difference between an atmospheric pressure and an intake manifold pressure and comprehensively determines activating A/C CUT considering operation conditions such as a brake operation, an acceleration, an inclination, and the atmospheric pressure and the like.

An air conditioner cut control system according to an exemplary embodiment of the present invention may include a driving condition detection unit detecting operation conditions of a vehicle, an air conditioner controller configured of determining an intake manifold negative pressure stored in a brake booster at a value obtained by subtracting intake manifold pressure from an atmospheric pressure detected by the driving condition detection unit when the air conditioner is operated and an engine control unit (ECU) for integrating the intake manifold negative pressure according to a brake negative pressure prediction logic and determining a virtual brake booster sensor value by modeling change of booster negative pressure according to driving information, and the ECU, and if the virtual brake booster sensor value is below a reference negative pressure of an A/C CUT standard logic, the ECU determines that brake negative pressure is insufficient and activates A/C CUT.

The air conditioner cut control system may further include a memory that stores the brake negative pressure prediction logic and stores modeling information related to the change of the booster negative pressure according to the intake manifold negative pressure and the driving information.

The driving condition detection unit may detect at least one driving information among an air conditioner operation condition, a vehicle speed, an atmospheric pressure, an intake manifold pressure, a brake operation condition, an altitude, a road gradient, a timer and a vehicle deceleration.

The ECU may set an initial value of the virtual brake booster sensor value, which corresponds to a first ratio of the intake manifold negative pressure initially determined when the air conditioner is operated.

The ECU may determine a temporary sensor value as a value corresponding to a second ratio of an intake manifold negative pressure peak value detected during a system update unit time in a charging condition of the booster negative pressure in which a brake is not operated, and wherein the second ratio is lower than the first ratio.

The ECU may update the virtual brake booster sensor value by exceeding the temporary sensor value if the temporary sensor value exceeds the virtual brake booster sensor value set to the initial value.

The ECU may fix the virtual brake booster sensor value to a predetermined value less than the reference negative pressure in the condition that the vehicle travels on a road having a predetermined gradient.

The ECU may update the virtual brake booster sensor value to reflect a brake negative pressure decompression rate by referring to a virtual brake booster sensor decompression rate control map in accordance with a brake operation in the booster negative pressure release condition.

The ECU may determine the booster decompression rate corresponding to a vehicle deceleration and the intake manifold negative pressure in the virtual brake booster sensor decompression rate control map during brake operation, and the ECU subtracts value of which the booster decompression rate is lasted for a system update time from the virtual brake booster sensor value.

The virtual brake booster sensor decompression rate control map may be set to increase the booster decompression rate as the vehicle deceleration increases under the same conditions of the intake manifold negative pressure.

The virtual brake booster sensor decompression rate control map may be set to decrease the booster decompression rate as the intake manifold negative pressure increases at the same vehicle deceleration conditions.

The ECU may reduce the reference negative pressure of an A/C CUT standard logic as the virtual brake booster sensor value increases by referring altitude change.

The ECU may increase a MAX vehicle speed condition of the A/C CUT standard logic at altitudes above a certain altitude by referring to a vehicle speed condition change map according to an altitude change condition.

An air conditioner cut control method for a vehicle of which a virtual brake booster sensor according to a brake negative pressure prediction logic is applied according to an exemplary embodiment of the present invention, the air conditioner cut control method may include (a) detecting operating information related to the vehicle when an air conditioner (A/C) is activated, and determining an intake manifold negative pressure stored in a brake booster at a value obtained by subtracting intake manifold pressure from an atmospheric pressure, (b) setting a value corresponding to a first ratio of the initially determined intake manifold negative pressure to an initial value of a virtual brake booster sensor value, (c) updating the virtual brake booster sensor value to an exceeded value if the value corresponding to a second ratio of an intake manifold negative pressure peak value exceeds the initial value in which a brake is not operated, (d) subtracting a booster decompression rate corresponding to a vehicle deceleration and an intake manifold negative pressure condition from the virtual brake booster sensor value when the brake is actuated and (e) activating A/C CUT when the virtual brake booster sensor value is less than a reference negative pressure of an A/C CUT standard logic.

The step (c) may include temporarily storing a value corresponding to a second ratio (where the second ratio is lower than the first ratio) of the intake manifold negative pressure peak value detected at a predetermined system update unit time to a temporary sensor value, maintaining the temporary sensor value as it is if the temporary sensor value is less than the virtual brake booster sensor value and if the temporary sensor value exceeds the virtual brake booster sensor value, updating the virtual brake booster sensor value to be the same as the exceeded temporary sensor value;

The step (c) or the step (d) may include fixing the virtual brake booster sensor value to a predetermined value less than the reference negative pressure when it is determined that the vehicle is traveling on a gradient road by detecting a road inclination in driving information.

The step (d) may include collecting an intake manifold negative pressure and vehicle deceleration from the driving information, determining the booster decompression rate according to the intake manifold negative pressure and the vehicle deceleration in a virtual brake booster sensor decompression rate control map and determining a first virtual brake booster sensor value in which the booster decompression rate is subtracted from the virtual brake booster sensor value.

The first virtual brake booster sensor value may be determined by subtracting the booster decompression rate times the predetermined system update unit time from the virtual brake booster sensor value.

In the step (e), an A/C CUT reference negative pressure condition may be changed according to the virtual brake booster sensor value and an altitude by referring to a variable reference negative pressure setting map, and wherein the reference negative pressure is decreased as the virtual brake booster sensor value is increased, and the reference negative pressure of the A/C CUT standard logic increases as the altitude rises.

In the step (e), a MAX vehicle speed condition of A/C CUT standard logic may be increased at altitudes above a certain altitude by referring to a vehicle speed condition change map according to an altitude change condition.

According to an exemplary embodiment of the present invention, the implementation of a virtual brake booster negative pressure sensor through brake negative pressure prediction logic in a vehicle with a booster negative pressure sensor omitted prevents the braking performance from being deteriorated without increasing the cost of hardware addition and the cooling performance may be secured.

Also, it is possible to prevent frequent occurrence of A/C CUT by modeling the booster negative pressure sensor according to the intake manifold negative pressure situation and various driving conditions and by deriving the virtual brake booster sensor value.

In the case of driving on an incline, it is also necessary to secure the brake performance by fixing the intake manifold negative pressure to a condition insufficient and to restricting the brake negative pressure prediction logic limiting the negative pressure prediction logic and to fix the maximum vehicle speed condition of A/C CUT standard logic at high altitudes So that the stability of the braking performance may be further improved. and in high altitudes, the maximum vehicle speed condition of A/C CUT standard logic is varied to improve the stability of the braking performance.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a view showing a virtual brake booster sensor decompression rate control map (MAP_1) according to an exemplary embodiment of the present invention.

FIG. 5 is a view showing an A/C CUT standard logic according to an exemplary embodiment of the present invention.

Figure 1:
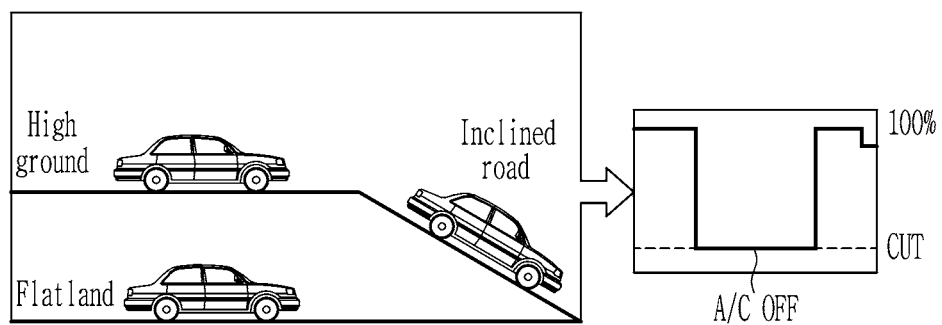
FIG. 1 is a conceptual view showing an A/C CUT logic using a conventional intake manifold negative pressure.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration.

As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising", will be understood to imply the inclusion of stated elements but not the exclusion of any other elements.

Furthermore, the terms "-er", "-or" and "module" described in the specification mean units for processing at least one function and operation and may be implemented by hardware components or software components and combinations thereof.

To efficiently explain the essential technical features of the present invention, the following embodiments will appropriately modify, integrate, or separate terms to be understood by those skilled in the art to which the present invention belongs. and the present invention is not limited thereto.

Throughout the specification, an intake manifold negative pressure refers to a source that estimates a brake negative pressure stored in a brake booster at a value minus an intake manifold pressure at atmospheric pressure.

It may be noted that an air conditioner cut control system and method of the present invention in the following description are distinguished from those of the related art in which a brake negative pressure is installed, because of solving the problem of using the intake manifold negative pressure.

An air conditioner control system and method according to an exemplary embodiment of the present invention will now be described in detail with reference to the drawings.

Figure 2:
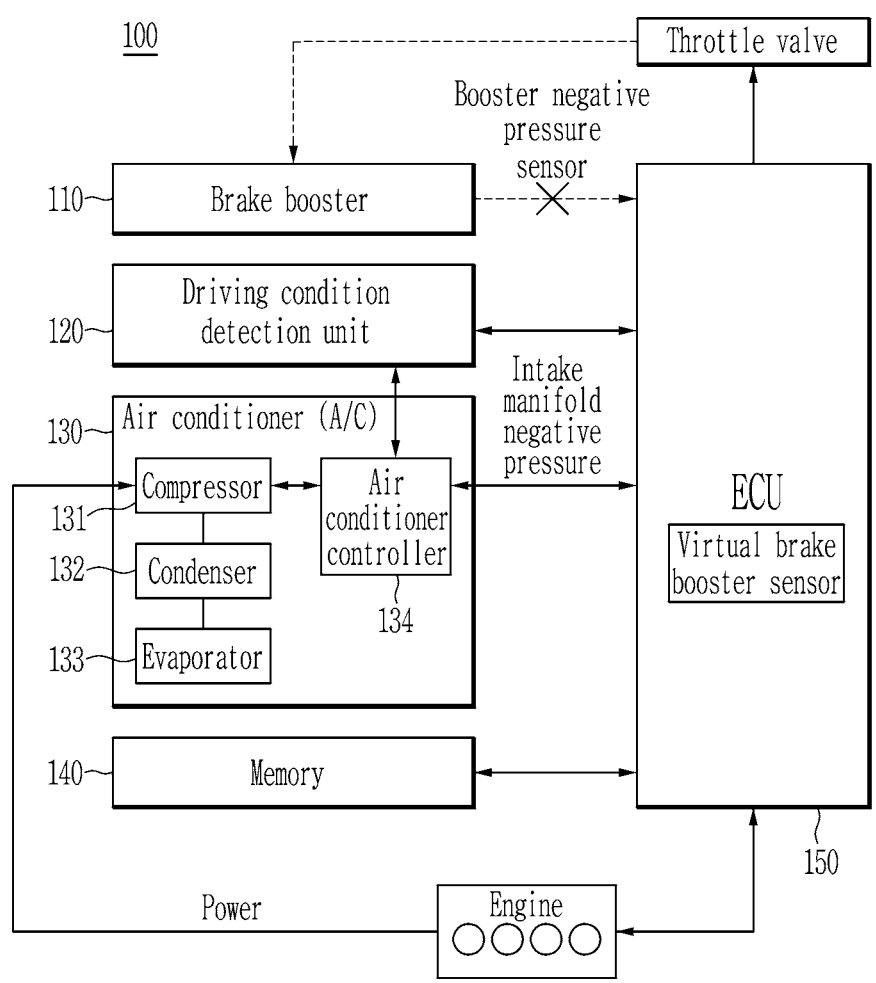
FIG. 2 is a view showing an air conditioner cut control system according to an exemplary embodiment of the present invention.

FIG. 2 is a view showing an air conditioner cut control system according to an exemplary embodiment of the present invention.

Referring to FIG. 2, an air conditioner cut control system 100 according to an exemplary embodiment of the present invention includes a driving condition detection unit 120, an air conditioner (A/C) 130, a memory 140, an ECU (Engine Control Unit/Electronic Control Unit) 150 and the like.

Prior to describing the exemplary embodiment of the present invention, since an air conditioner cut control system 100 according to an exemplary embodiment of the present invention utilizes an intake manifold negative pressure rather than a brake negative pressure measured in a real booster negative pressure sensor, the interlocking relationship with peripheral devices on the characteristic will be discussed.

The brake booster 110 stores the negative pressure to mechanically amplify braking force when a driver steps on a brake pedal and, and transfers the pressure to the brake for vehicle braking when the brake pedal is actuated.

In the instant case, the source of the pressure used by the brake booster 110 is the intake manifold negative pressure, which is the difference between the atmospheric pressure and the intake manifold pressure. The intake manifold negative pressure is increased as a throttle valve (TPS) is opened. Furthermore, if the driver presses the accelerator pedal or if the throttle valve (TPS) is opened by depressing the brake pedal when driving at low speed, the intake manifold negative pressure becomes "0" as the atmospheric pressure becomes equal to the intake manifold pressure with inflow of air. For the present reason, despite the fact that enough negative pressure is stored in the actual brake booster, the intake manifold negative pressure is determined to be small, which has the side effect of causing frequent A/C CUT.

The air conditioner cut control system 100 according to an exemplary embodiment of the present invention includes a virtual brake booster sensor according to a brake negative pressure prediction logic in the ECU 150 to accumulate the difference between the atmospheric pressure and the intake manifold pressure, and A/C CUT reduction control according to the determined virtual brake booster sensor value is performed.

The driving condition detection unit 120 detects the measured driving information from various sensors and an air conditioner controller 134 according to the vehicle driving state. Here, the driving information may be data measured from a sensor and the air conditioner controller 134, or processed in a form necessary for an air conditioner control.

The driving condition detection unit 120 may include a vehicle speed sensor, an atmospheric pressure sensor, an intake manifold pressure sensor, a transmission shift sensor, an accelerator pedal sensor, a Brake Pedal Sensor (BPS), an altitude sensor, an inclination sensor, a timer and an accelerometer, and the like, and the driving condition detection unit 120 provides the detected information to the ECU 150 and the air conditioner controller 134.

The air conditioner (A/C) 130 is a device configured for cooling, ventilation and heating in a vehicle, including a compressor 131, a condenser 132, an evaporator 133 and the air conditioner controller 134.

The compressor 131 compresses coolant received from the evaporator 133 and transfers the compressed coolant to the condenser 132 when the air conditioner 130 is operated. The compressor 131 may be configured as a variable displacement compressor for the vehicle, which generates pressure by utilizing power of the engine transmitted through a belt.

The condenser 132 condenses and liquefies the coolant compressed by the compressor 131.

The evaporator 133 vaporizes the coolant liquefied by the condenser 132.

Furthermore, the description of the basic configuration of the air conditioner (A/C) is well-known to a person of an ordinary skill in the art and thus detailed description will be omitted.

The air conditioner controller 134 controls the overall operation of the air conditioner 130, and controls the operation ratio (A/C duty) of the compressor 131 according to the brake negative pressure condition in conjunction with the ECU 150.

The air conditioner controller 134 determines the intake manifold negative pressure stored in the brake booster 110 by subtracting the intake manifold pressure from the atmospheric pressure detected by the driving information, and transmits the determined intake manifold negative pressure to the ECU 150.

The memory 140 stores various programs and data for reducing the frequency of air conditioner cut control of the vehicle according to an exemplary embodiment of the present invention, and updates data generated according to the operation.

For example, the memory 140 stores the brake negative pressure prediction logic and stores changes of the booster pressure according to the various intake manifold negative pressure of the virtual brake booster sensor and driving conditions.

This modeling information includes a plurality of control maps of the brake booster negative pressure charging condition and the release condition which are set according to actual vehicle test value and external environmental condition.

Since the modeling information is a factor for predicting the value of the virtual brake booster sensor rather than an actual value, it is set as conservative as possible to ensure stable braking performance while preventing deterioration of cooling performance.

The ECU 150 is an electronic control apparatus that drives the engine and controls the overall operation of the vehicle to reduce the frequency of A/C CUT according to an exemplary embodiment of the present invention.

The ECU 150 controls the amount of fuel injection according to the operation of the engine (compressor, alternator, etc.) so that the engine may be operated with stable RPM.

Throttle opening is regulated according to fuel injection control of ECU 150. The throttle opening increases as fuel injection amount increases, and the throttle opening decreases as fuel injection amount decreases.

Here, when the throttle opening becomes large, the intake manifold negative pressure, which is the difference between the atmospheric pressure and the intake manifold pressure, becomes small. In the instant case, the ECU 150 takes measures to move the throttle valve in the closing direction when the intake manifold pressure information received by the air conditioning controller 134 is insufficient.

Conventionally, there are various methods of moving the throttle valve in the closing direction thereof, but generally, a method of stopping the operation of auxiliary apparatuses may be used. Typically, the A/C CUT control is used to stop the compressor 131 for a few seconds, which is less susceptible to a relative instantaneous OFF control The A/C CUT can reduce the engine load and thereby control the throttle valve in the closed direction to acquire negative pressure.

That is, the ECU 150 controls the throttle valve in the closed direction by reducing the required torque used in the compressor 131 through A/C CUT control, recovering the negative pressure.

Furthermore, the ECU 150 controls the amount of fuel injection based on the torque demanded by the accelerator pedal operation of the driver as well as the torque required by the auxiliary apparatuses (e.g., compressor, alternator, etc.).

The ECU 150 reflects the required torque for operation of the air conditioner 130 according to the temperature setting to the entire required torque and compensates the fuel injection amount and the opening amount of the throttle valve corresponding to the engine load.

The ECU 150 acts as the virtual brake booster sensor according to the brake negative pressure prediction logic. Through this, the ECU 150 determines the brake negative pressure shortage due to the virtual brake booster sensor value derivation and controls A/C CUT control.

At the instant time, if A/C CUT is generated when it is determined that the derived negative brake booster sensor value is less than the reference negative pressure and the brake negative pressure is insufficient, the ECU 150 can support a negative pressure recovery mode in which the fuel injection amount is decreased and the throttle valve (TPS) is controlled in the closing direction thereof.

The ECU 150 receives driving condition information through the driving condition detection unit 120 such as the air condition ON/OFF, the vehicle speed, the atmospheric pressure, the intake manifold pressure, the accelerator pedal operation state, brake operation status, altitude, road gradient, timer and vehicle deceleration (m/s$^2$) and the like.

ECU 150 receives the intake manifold negative pressure information from the air conditioner controller 134 and performs the function of the virtual brake booster sensor to accumulate the intake manifold negative pressure. As such, the ECU 150 comprehensively determines the detected operation information according to the state of the vehicle through the negative pressure prediction logic and derives a virtual brake booster sensor value.

Here, the brake negative pressure prediction logic is obtained by modeling the result of experimenting with the brake booster negative pressure charging condition and release condition of the actual vehicle. Therefore, the negative pressure charging condition and the release condition will be described separately in the following description.

First, the ECU 150 derives the virtual brake booster sensor value for how much the brake negative pressure is filled in a brake inactivation state (BPS=OFF) in which no negative pressure is used in the brake booster negative pressure charging condition.

Figure 3:
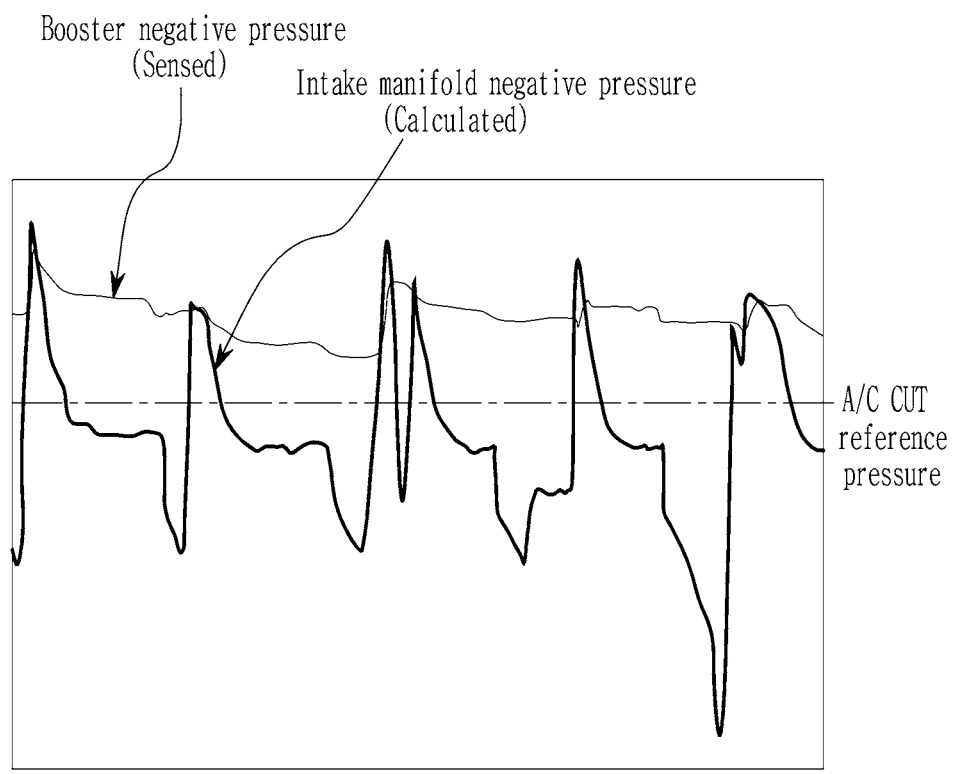
FIG. 3 is a graph showing for explaining a method of setting a virtual brake booster sensor value according to a booster negative pressure charging condition according to an exemplary embodiment of the present invention.

FIG. 3 is a graph showing for explaining a method of setting a virtual brake booster sensor value according to a booster negative pressure charging condition according to an exemplary embodiment of the present invention.

In FIG. 3, the comparisons of the booster negative pressure measured at the actual booster negative pressure sensor and the intake manifold negative pressure, which is the difference between the atmospheric pressure and the intake manifold pressure in the same conventional vehicle operation conditions are shown.

The graph shows that the booster negative pressure measured at the sensor is slowly decreasing with the brake actuation and is restored when the brake is released and shows a state where sufficient negative pressure is maintained. On the other hand, the intake manifold negative pressure, under the same condition, opens the throttle valve in order not to turn off the engine so that the intake manifold negative pressure, which is the difference between the atmospheric pressure and the intake manifold pressure, drops rapidly below the reference negative pressure. and thus, the A/C CUT is frequently generated.

However, considering only the booster negative pressure charging condition, the booster negative pressure is restored to almost the same level as the intake manifold negative pressure rises.

Considering the above condition, the air conditioner controller 134 can set the virtual brake sensor value at a level close to the intake manifold negative pressure (e.g., 80%) in the booster negative pressure charging condition.

The ECU 150 activates a function as the virtual brake booster sensor when the air conditioner operates (A/C ON), and determines the first ratio of the intake manifold negative pressure determined at the beginning of A/C CUT. For example, the value corresponding to 90% (intake manifold negative pressure*0.9) is set as the initial value of the virtual brake booster sensor value.

As such, the ECU 150 updates the virtual brake booster sensor value based on the maximum value that corresponds to 80% of the intake manifold negative pressure determined in the brake inactivation condition (BPS=OFF) exceeds the initial value.

For example, when the initial virtual brake booster sensor value is set to 600 hPa, ECU 150 determines a second ratio of the intake manifold negative pressure in the driving condition, for example, 80% (intake manifold negative pressure*0.8) and within the previous system update unit time (eg 10 ms), the 600 hPa may be maintained.

The second ratio may be lower than the first ratio.

Thereafter, the ECU 150 may update the virtual brake booster sensor value to an excess value when the value corresponding to 80% of the intake manifold negative pressure determined in the next update period exceeds the initial value 600 hPa. That is, the ECU 150 the ECU 150 may update the virtual brake booster sensor value to be increased except for the negative pressure release condition where the virtual brake booster sensor value goes down by the brake operation (BPS=ON). The reason for setting the virtual brake booster sensor value to 90% or 80% of the intake manifold negative pressure is to maximally conservatively determine the virtual sensor value for the characteristic safety, which is not a measured value.

However, the ECU 150 always fixes the virtual brake booster sensor value at a predetermined value less than the reference negative pressure in a condition that the gradient of the road having a slope of −2% or less. For example, if the reference negative pressure is set to 266 hPa as in A/C CUT standard logic, the virtual brake booster sensor value can always be updated to 200 hPa in the slope run condition.

This is due to the fact that, in areas where the brake negative pressure is sufficient depending on the driving situation, the unnecessary A/C CUT is avoided by use of the conservative virtual brake booster sensor value. However, in the area where the risk of accidents is increased due to the lack of brake negative pressure, the logic is improved to secure the stability by more active brake negative pressure recovery.

Next, the brake booster negative pressure release condition in the brake negative pressure prediction logic is described.

ECU 150 derives the virtual brake booster sensor value of how much brake negative pressure is left and used in accordance with the operating information in the brake operation (BPS=ON) state in the brake release condition.

The ECU 150 stops incremental updating of the virtual brake booster sensor value in the negative pressure release condition in which the brake operation (BPS=ON) is detected. As such, the virtual brake booster sensor value is updated to be reduced to reflect the brake negative pressure reduction (booster decompression rate) according to the brake operation.

FIG. 4 is a view showing a virtual brake booster sensor decompression rate control map (MAP_1) according to an exemplary embodiment of the present invention.

Referring to FIG. 4, an exemplary embodiment of the present invention, a virtual brake booster sensor decompression rate control map (MAP_1) stores the booster decompression rate for updating the virtual brake booster sensor value according to the intake manifold negative pressure, the vehicle deceleration (change rate of speed) and the operation time (for example, 10 ms intervals) when the brake is operated.

The virtual brake booster sensor decompression rate control map (MAP_1) is set by simulating the sensor value without mounting the actual booster negative pressure sensor. In an exemplary embodiment of the present invention, the booster decompression rate according to the pressure change in the braking situation may be conservatively modeled to ensure safe braking performance.

The booster decompression rate is increased at the virtual brake booster sensor decompression rate control map (MAP_1) from the condition with the lowest vehicle deceleration (e.g., less than 0.1 m/s$^2$) to the highest condition (e.g., greater than 2.0 m/s$^2$) under the same intake manifold negative pressure condition (e.g., less than 50 hPa).

Also, the booster decompression rate is set to decrease as the intake manifold negative pressure increases from the lowest condition (e.g., less than 50 hPa) to the highest condition (e.g., greater than 250 hPa) under the same vehicle deceleration conditions (e.g., less than 0.1 m/s$^2$).

This reflects the weight value in the booster decompression rate in view of the faster negative pressure escaping under conditions where the intake manifold negative pressure is insufficient, rather than a condition where the actual intake manifold negative pressure is sufficient.

The ECU 150 determines the booster decompression rate corresponding to a vehicle deceleration and intake manifold negative pressure conditions detected during brake operation in the virtual brake booster sensor decompression rate control map (MAP_1) and the value that the booster decompression rate lasts for the system update time is subtracted from the virtual brake booster sensor value.

For example, if the vehicle deceleration detected at the brake operation is 0.5 m/s$^2$ and the intake manifold negative pressure is 200 hPa, the ECU 150 multiplies the booster decompression rate 20 hPa/s by the system update unit time 10 ms, and the update may be performed by subtracting the multiplied value from the booster sensor value.

FIG. 5 is a view showing an A/C CUT standard logic according to an exemplary embodiment of the present invention.

Referring to FIG. 5, the A/C CUT standard logic (MAP_2) according to the exemplary embodiment of the present invention shows A/C CUT entry condition considering the operation information such as reference negative pressure and vehicle speed due to brake operation and release.

For example, if the vehicle is traveling at a low speed condition (0.1-10.0 kph) at which the vehicle is not completely stopped, regardless of the altitude at the brake operation condition (BPS=ON) and the virtual brake booster sensor value is less than a predetermined reference negative pressure (eq, 266 hPa) (AND condition), the ECU 150 controls A/C CUT.

Furthermore, regardless of the altitude, the vehicle is stopped at a brake inoperative condition (BPS=OFF) or running at a low speed condition (0.0-10.0 kph), and the virtual brake booster sensor value is less than a predetermined reference negative pressure (eq, 240 hPa) (AND condition), the ECU 150 can control A/C CUT.

Here, the ECU 150 adjusts the reference negative pressure (hPa), which determines A/C CUT entry, accounting for the virtual brake booster sensor value and the altitude (m), which are varied according to the booster negative pressure charging condition and release condition.

Figure 6:
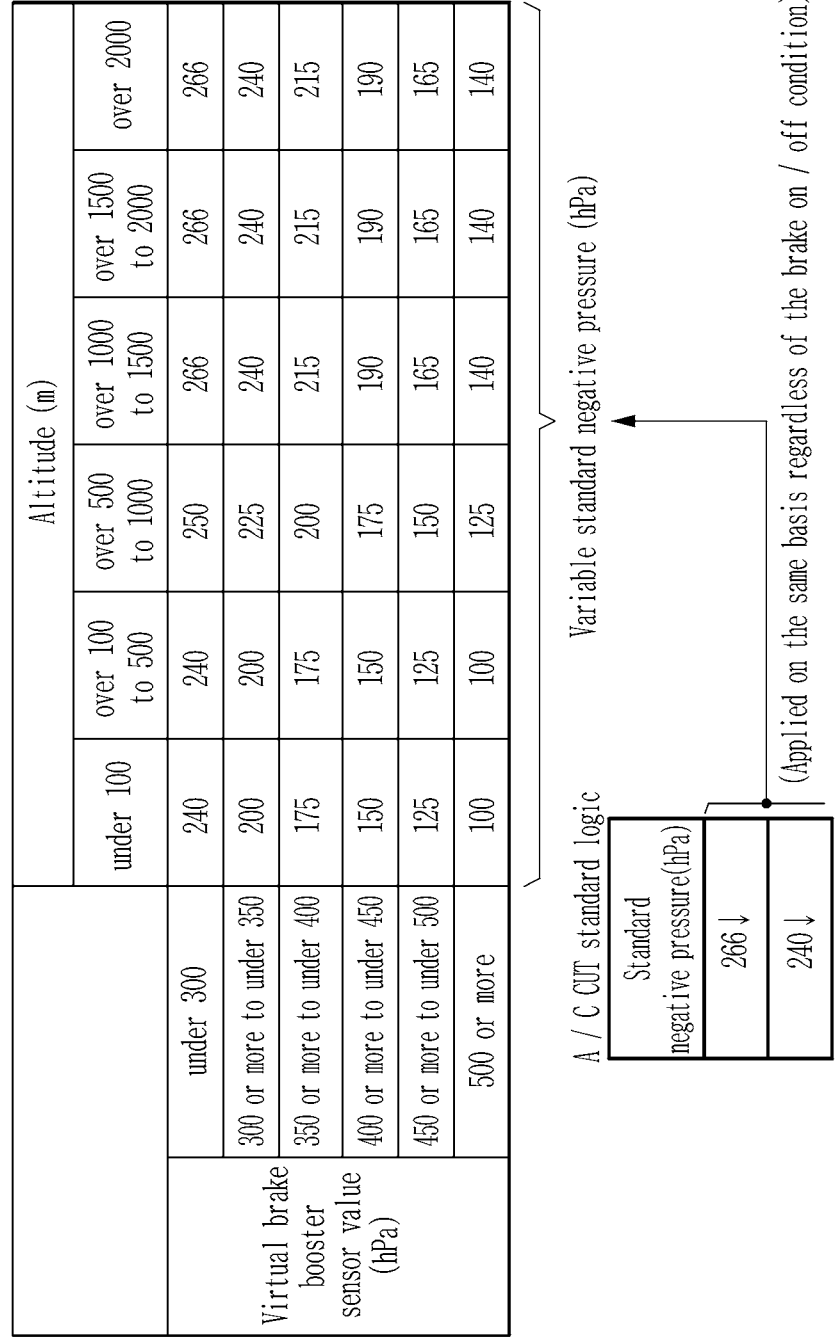
FIG. 6 is a view showing a variable standard negative pressure (hPa) map (MAP_3) in accordance with a virtual brake booster sensor value and altitude according to an exemplary embodiment of the present invention.

FIG. 6 is a view showing a variable standard negative pressure (hPa) map (MAP_3) in accordance with a virtual brake booster sensor value and altitude according to an exemplary embodiment of the present invention.

Referring to FIG. 6, an exemplary embodiment of the present invention, the variable standard negative pressure map (MAP_3) stores the variations of the reference negative pressure (hPa) by the virtual brake booster sensor value condition and the altitude (m) condition.

For example, when the reference negative pressure is 266 hPa in the A/C CUT standard logic of FIG. 5, if the virtual brake booster sensor value is above 300 hPa, the brake negative pressure is sufficient and if the virtual brake booster sensor value is below 300 hPa, the brake negative pressure is insufficient.

The variable standard negative pressure map (MAP_3) is set so that the reference negative pressure (hPa) gradually decreases as the virtual brake booster sensor value increases under the condition that the virtual brake booster sensor value is 300 hPa or more. This is to prevent the occurrence of A/C CUT by arbitrarily filtering the situation where the brake negative pressure is sufficient.

Therefore, referring to the variable standard negative pressure map (MAP_3), the ECU 150 can control the reference negative pressure of A/C CUT standard logic to be lower as the brake negative pressure increases to 300 hPa or more.

On the other hand, when the virtual brake booster sensor value is less than 300 hPa and the brake negative pressure is insufficient, the ECU 150 can set the reference negative pressure to a value which is somewhat lower than or equal to A/C CUT standard logic according to the altitude.

Also, the ECU 150 can refer to the variable standard negative pressure map (MAP_3) and set the reference negative pressure of A/C CUT standard logic to be higher as the altitude increases. This is to shorten the entry point of A/C CUT for negative pressure recovery by setting the reference negative pressure to be higher as the altitude increases considering the characteristic that brake booster negative pressure decreases as altitude increases The standard negative pressure values in the present variable standard negative pressure map (MAP_3) may be applied on the same basis regardless of the brake on/off condition.

On the other hand, the ECU 150 can control referring to the vehicle speed condition in A/C CUT standard logic to additionally recover the brake negative pressure when the altitude rises.

Figure 7:
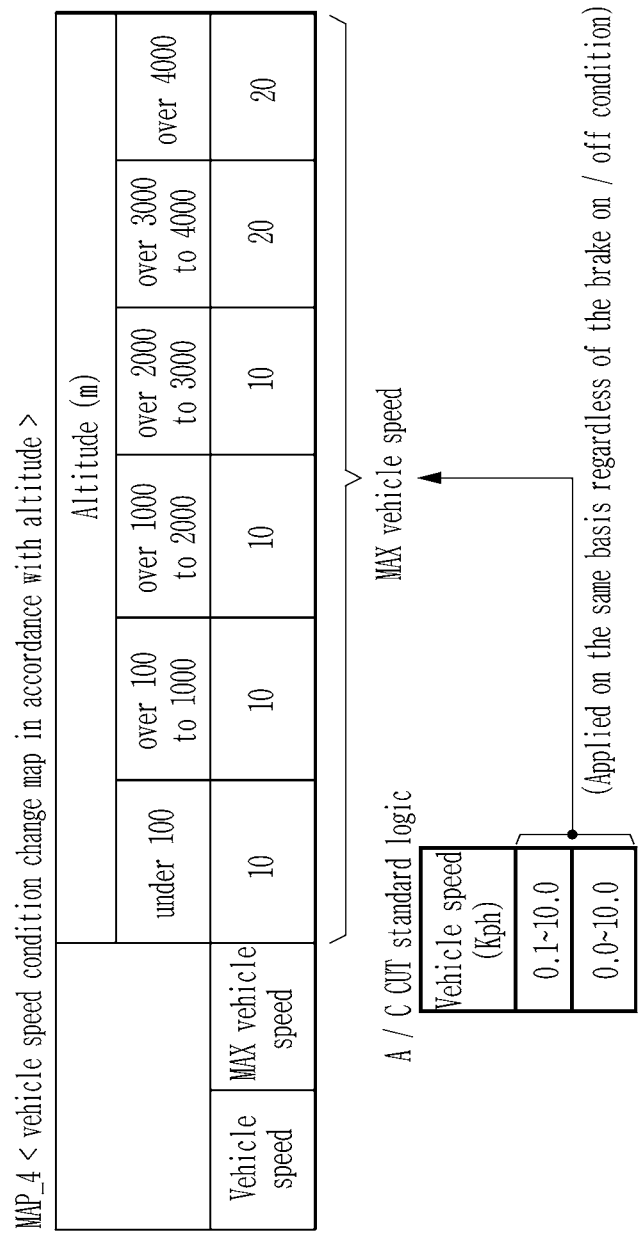
FIG. 7 is a view showing a vehicle speed condition change map (MAP_4) in accordance with altitude according to an exemplary embodiment of the present invention.

FIG. 7 is a view showing a vehicle speed condition change map (MAP_4) in accordance with altitude according to an exemplary embodiment of the present invention.

Referring to FIG. 7, the vehicle speed condition change map (MAP_4) according to the altitude variation stores the maximum (MAX) vehicle speed in A/C CUT standard logic according to the altitude (m) variation.

For example, the ECU 150 controls the maximum vehicle speed to increase at a certain altitude or higher when the maximum vehicle speed in A/C CUT standard logic is 10 Kph, increasing the recovery amount of the brake negative pressure.

Figure 8:
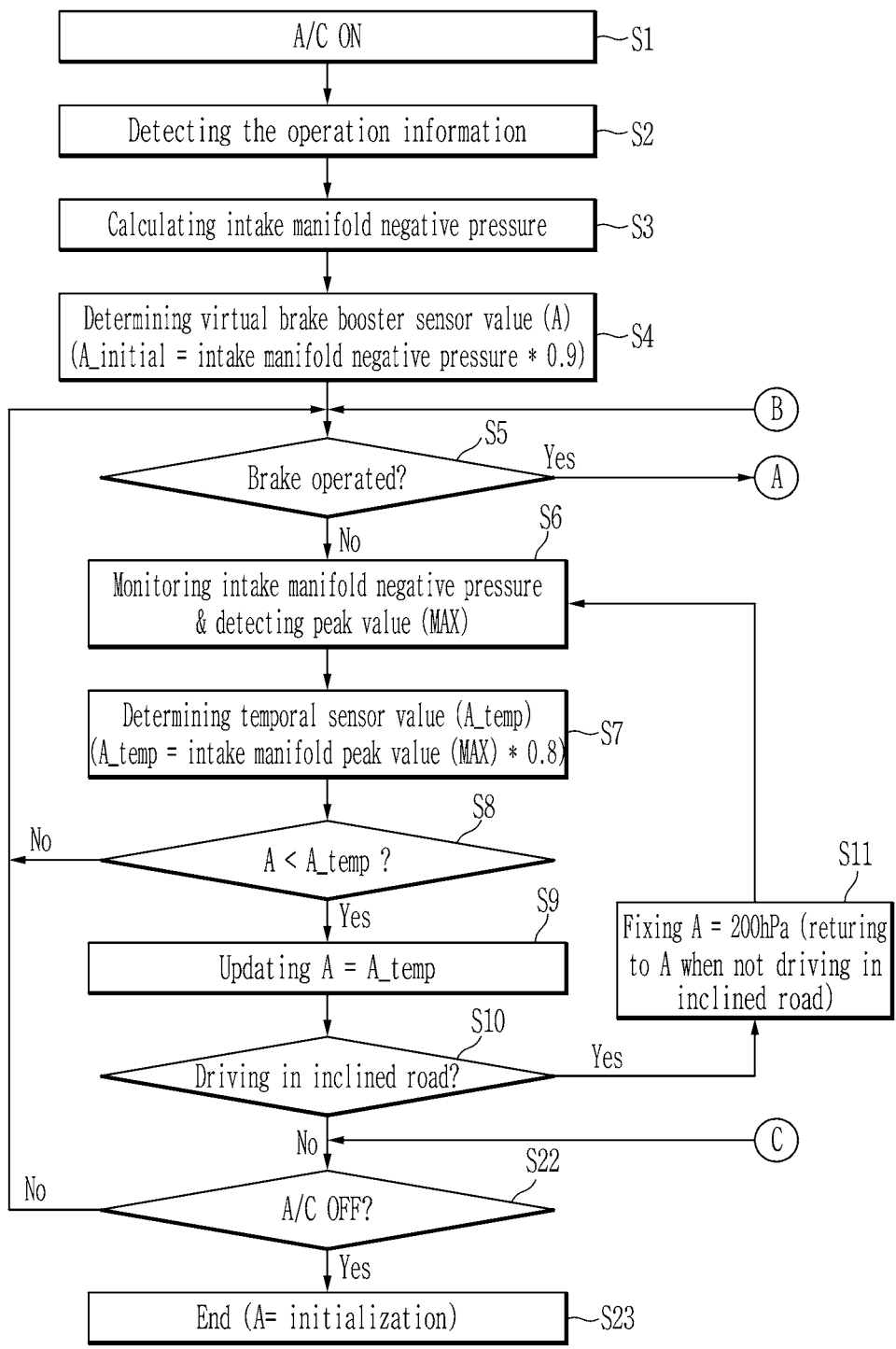
FIG. 8 and FIG. 9 are flowcharts an air conditioner cut control method according to an exemplary embodiment of the present invention.
Figure 9:
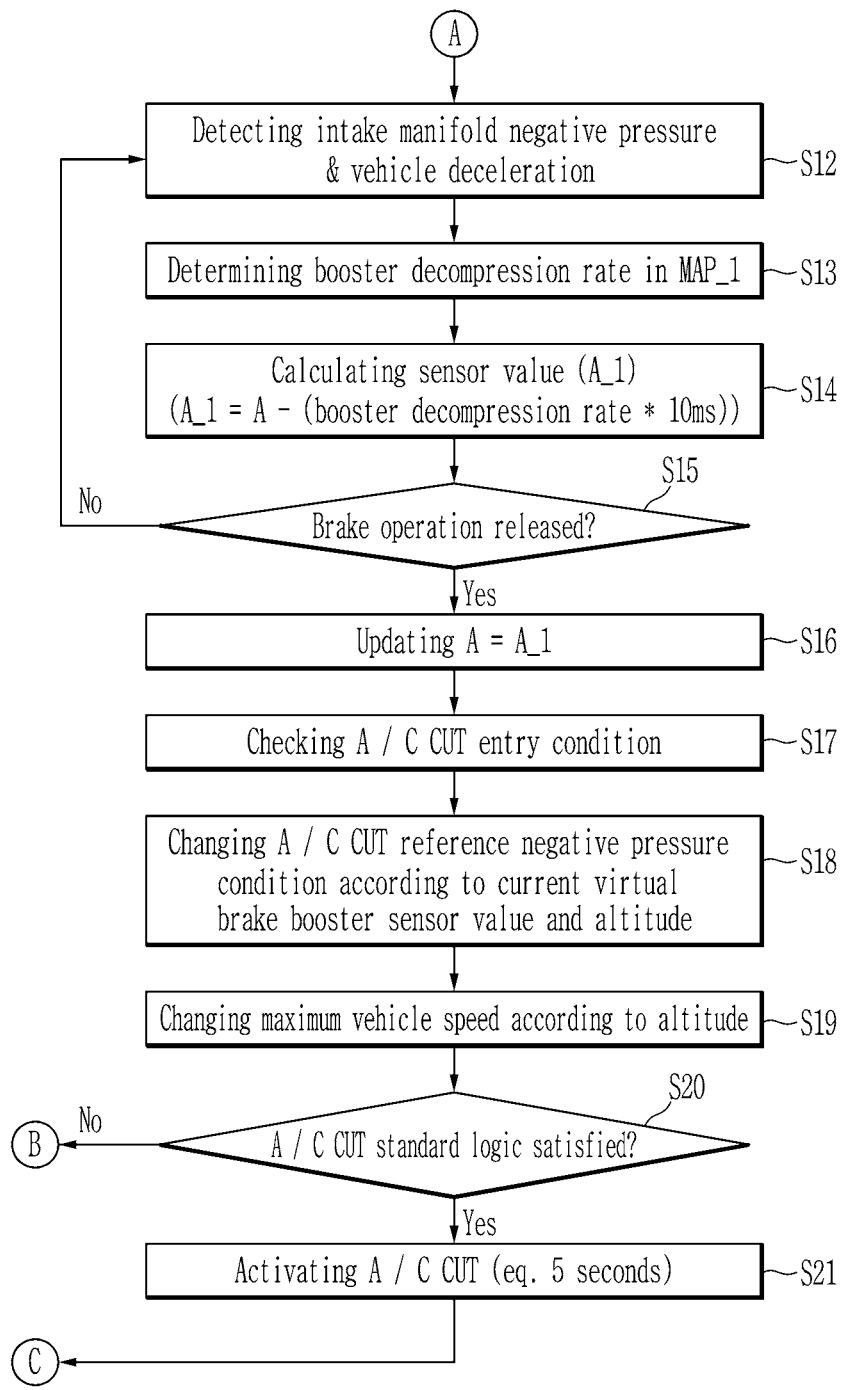

Based on the configuration of the air conditioner cut control system 100 described above, an air conditioner control method of the vehicle according to an exemplary embodiment of the present invention is described referring to FIG. 8 and FIG. 9.

In the above description, the air conditioner cut control system 100 has been described in detail, but it may be subdivided into individual functions or integrated into one system. Therefore, in describing the vehicle air conditioner control method, the subject will be referred to as the air conditioner cut control system 100.

FIG. 8 and FIG. 9 are flowcharts an air conditioner cut control method according to an exemplary embodiment of the present invention.

Referring to FIG. 8 and FIG. 9, the air conditioner cut-off control system 100 according to an exemplary embodiment of the present invention detects the operation information related to the vehicle (S2) when the air conditioner is operated (A/C ON) (S1). The air conditioner cut control system 100 can detect vehicle speed, the atmospheric pressure, BPS operation, altitude, slope, time, and deceleration through the driving condition detection unit 120.

The air conditioner cut control system 100 determines the intake manifold negative pressure stored in the brake booster by subtracting the intake manifold pressure from the atmospheric pressure detected as the operating information (S3).

The ECU 150 or the air conditioner cut control system 100 activates the function as the virtual brake booster sensor and determines a value corresponding to 90% (first ratio) of the intake manifold negative pressure determined at the beginning of the A/C ON as a virtual brake booster sensor value (A) as the initial value (S4).

Thereafter, the ECU 150 determines whether the brake is operated (S5). and if the brake is not activated, the ECU 150 updates the virtual brake booster sensor value (A) in the booster negative pressure charging condition as follows.

The ECU 150 monitors the real-time updated intake manifold negative pressure and detects the peak value (MAX) of the intake manifold negative pressure in time unit, for example, 10 ms (S6).

The ECU 150 determines a temporary sensor value (A temp) corresponding to 80% (second ratio) of the intake manifold negative pressure peak value (MAX) and stores it temporarily (S7).

The ECU 150 compares the temporary sensor value A temp with the initially determined virtual brake booster sensor value A in step S8 and returns to step S5 if the temporary sensor value A temp is less than the virtual brake booster sensor value A.

On the other hand, the ECU 150 updates the virtual brake booster sensor value (A) with the exceeded temporary sensor value (A temp) if the temporary sensor value (A temp) exceeds the virtual brake booster sensor value (A) (S9).

In the present booster negative pressure charging condition, since the negative pressure is not used, the virtual brake booster sensor value (A) is always updated up to the maximum value. The virtual brake booster sensor value (A) updated in the present manner is used as a reference value for subtracting the booster decompression rate determined in the condition of S5.

On the other hand, if it is determined that the vehicle is traveling on an inclined road, for example, an inclination of −2% or less (S10), the ECU 150 fixes the virtual brake booster sensor value (A) to a predetermined value, for example, 200 hPa. (S11)

This is to limit the use of the determined value of the virtual brake booster sensor value (A), assuming that the negative pressure is insufficient for the ramp or inclination road where the braking performance is important. and if not on the ramp condition, it will return to using the virtual brake booster sensor value (A).

On the other hand, the air conditioner cut control system 100 repeats the above process until the air conditioner is stopped (A/C OFF) (S21; YES), if the vehicle is not traveling on the inclined road. and when the air conditioner is stopped (A/C OFF) (S21; YES), the virtual brake booster sensor value A is initialized (S23). That is, the virtual brake booster sensor value (A) temporarily stored in the memory 140 is reset without being used in the next operation (A/C ON).

In step S5, the ECU 150 collects the intake manifold negative pressure and vehicle deceleration information when the brake is activated.

The ECU 150 determines the booster decompression rate according to the intake manifold negative pressure and vehicle deceleration in the virtual brake booster sensor decompression rate control map (MAP_1) (S13).

The ECU 150 determines the first virtual brake booster sensor value A_1, subtracting the booster decompression rate from the virtual brake booster sensor value (A) (S14). The first virtual brake booster sensor value A_1 may be determined by subtracting the booster decompression rate times the system update unit time 10 ms from the virtual brake booster sensor value (A).

If the brake is not released (S15; NO), the ECU 150 returns to the step S12 to obtain a second virtual brake booster sensor value A_2 obtained by subtracting the booster decompression rate based on the intake manifold negative pressure and vehicle deceleration collected in the next system update period.

The ECU 150 updates the virtual brake booster sensor value (A) downwardly in the same manner as the first virtual brake booster sensor value A_1 that reflects the booster decompression rate (S16).

The ECU 150 checks A/C CUT entry condition due to lack of brake negative pressure based on A/C CUT standard logic (MAP_2) (S17.)

At the instant time, the ECU 150 can change A/C CUT reference negative pressure condition according to the current virtual brake booster sensor value (A) and the altitude by referring to the variable standard negative pressure map (MAP_3) (S18)

For example, the ECU 150 changes the reference negative pressure of A/C CUT standard logic to decrease as the booster negative pressure rises in a sufficient direction of the virtual brake booster sensor value (A) and can control the reference negative pressure of A/C CUT standard logic to increase as the altitude rises.

Furthermore, the ECU 150 may change the maximum vehicle speed in the vehicle speed condition of A/C CUT standard logic at an altitude above a certain level by referring to the vehicle speed condition change map (MAP_4) for altitude variation (S19).

However, if the steps of S18 and S19 do not correspond to each change condition, the A/C CUT entry condition is checked without changing A/C CUT standard logic.

The ECU 150 returns to the step S5 if the vehicle operation information does not satisfy A/C CUT standard logic (S20; NO), and performs the next operation according to whether the brake is operated or not.

On the other hand, the ECU 150 determines whether A/C CUT standard logic is satisfied such that the vehicle is running at a low speed condition below a certain vehicle speed at which the vehicle is not at rest, and the virtual brake booster sensor value (A) is below the predetermined reference negative pressure in step S20, (YES). Which means A/C CUT standard logic is satisfied, the ECU 150 activates A/C CUT and holds A/C CUT for a predetermined time and releases A/C CUT (S21) for example during 5 seconds.

Thereafter, the air conditioner cut control system 100 returns to the step S22 and performs the next operation according to whether the air conditioner is operated or not.

As described above, according to the exemplary embodiments of the present invention, by implementing the virtual brake booster negative pressure sensor through the brake negative pressure prediction logic in the vehicle in which the booster negative pressure sensor is omitted, it is possible to prevent the braking performance from being deteriorated without increasing cost due to hardware addition, and cooling performance may be ensured.

Also, by deriving the virtual brake booster sensor value by modeling the booster negative pressure variation according to the intake manifold negative pressure condition and various vehicle operation conditions, it is possible to prevent frequent A/C CUT occurrence.

In the ramp condition, it is assumed that the intake manifold negative pressure is insufficient and brake performance is secured by limiting the brake negative pressure prediction logic. In high altitudes, the maximum vehicle speed condition of A/C CUT standard logic is adjusted to improve the stability of braking performance.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An air conditioner cut control system comprising:
   a driving condition detection unit configured of detecting operation conditions of a vehicle;
   an air conditioner controller configured of determining an intake manifold negative pressure stored in a brake booster at a value obtained by subtracting intake manifold pressure from an atmospheric pressure detected by the driving condition detection unit when an air conditioner is operated; and
   an engine control unit (ECU) configured of integrating the intake manifold negative pressure according to a brake negative pressure prediction logic and determining a virtual brake booster sensor value by modeling change of booster negative pressure according to driving information, and when the virtual brake booster sensor value is below a reference negative pressure of an A/C CUT standard logic, the ECU is configured to determine that brake negative pressure is insufficient and activates A/C CUT,
   wherein the ECU is configured to set an initial value of the virtual brake booster sensor value, which corresponds to a first ratio of the intake manifold negative pressure initially determined when the air conditioner is operated,
   wherein the ECU is configured to determine a temporary sensor value as a value corresponding to a second ratio of an intake manifold negative pressure peak value detected during a system update unit time in a charging condition of the booster negative pressure in which a brake is not operated, and
   wherein the second ratio is lower than the first ratio.

2. The air conditioner cut control system of claim 1, further including:
   a memory that stores the brake negative pressure prediction logic and stores modeling information related to the change of the booster negative pressure according to the intake manifold negative pressure and the driving information.

3. The air conditioner cut control system of claim 1,
   wherein the driving condition detection unit detects at least a driving information among an air conditioner operation condition, a vehicle speed, an atmospheric pressure, an intake manifold pressure, a brake operation condition, an altitude, a road gradient, a timer and a vehicle deceleration.

4. The air conditioner cut control system of claim 1,
   wherein the ECU is configured to update the virtual brake booster sensor value by exceeding the temporary sensor value when the temporary sensor value exceeds the virtual brake booster sensor value set to the initial value.

5. The air conditioner cut control system of claim 1,
   wherein the ECU is configured to fix the virtual brake booster sensor value to a predetermined value less than the reference negative pressure when the vehicle travels on a road having a predetermined gradient.

6. The air conditioner cut control system of claim 1,
   wherein the ECU is configured to update the virtual brake booster sensor value to reflect a brake negative pressure decompression rate by referring to a virtual brake booster sensor decompression rate control map in accordance with a brake operation in the booster negative pressure release condition.

7. The air conditioner cut control system of claim 6,
   wherein the ECU is configured to determine a booster decompression rate corresponding to a vehicle deceleration and the intake manifold negative pressure in the virtual brake booster sensor decompression rate control map during brake operation, and the ECU subtracts value of which the booster decompression rate is lasted for a system update time from the virtual brake booster sensor value.

8. The air conditioner cut control system of claim 6,
   wherein the virtual brake booster sensor decompression rate control map is set to increase a booster decompression rate as the vehicle deceleration increases under the same intake manifold negative pressure.

9. The air conditioner cut control system of claim 8,
   wherein the virtual brake booster sensor decompression rate control map is set to decrease the booster decompression rate as the intake manifold negative pressure increases under the same intake manifold negative pressure.

10. The air conditioner cut control system of claim 1,
    wherein the ECU reduces the reference negative pressure of the A/C CUT standard logic as the virtual brake booster sensor value increases by referring altitude change.

11. The air conditioner cut control system of claim 1,
    wherein the ECU is configured to increase a MAX vehicle speed condition of the A/C CUT standard logic at altitudes above a predetermined altitude by referring to a vehicle speed condition change map according to an altitude change condition.

12. An air conditioner cut control method for a vehicle of which a virtual brake booster sensor according to a brake negative pressure prediction logic is applied, the air conditioner cut control method comprising:
    (a) detecting, by a controller, operating information related to the vehicle when an air conditioner (A/C) is activated, and determining an intake manifold negative pressure stored in a brake booster at a value obtained by subtracting intake manifold pressure from an atmospheric pressure;
    (b) setting, by the controller, a value corresponding to a first ratio of the determined intake manifold negative pressure to an initial value of a virtual brake booster sensor value;

(c) updating, by the controller, the virtual brake booster sensor value to an exceeded value when the value corresponding to a second ratio of an intake manifold negative pressure peak value exceeds the initial value in which a brake is not operated;

(d) subtracting, by the controller, a booster decompression rate corresponding to a vehicle deceleration and an intake manifold negative pressure condition from the virtual brake booster sensor value when the brake is actuated; and (e) activating, by the controller, A/C CUT when the virtual brake booster sensor value is less than a reference negative pressure of an A/C CUT standard logic, wherein the step (c) includes:

for a predetermined time storing a value corresponding to a second ratio of the intake manifold negative pressure peak value detected at a predetermined system update unit time to a temporary sensor value, wherein the second ratio is lower than the first ratio;

maintaining the temporary sensor value when the temporary sensor value is less than the virtual brake booster sensor value; and when the temporary sensor value exceeds the virtual brake booster sensor value, updating the virtual brake booster sensor value to be a same as the exceeded temporary sensor value.

13. The air conditioner cut control method of claim 12, wherein the step (c) or the step (d) includes:

fixing the virtual brake booster sensor value to a predetermined value less than the reference negative pressure when it is determined by the ECU that the vehicle is traveling on a gradient road by detecting a road inclination in driving information.

14. The air conditioner cut control method of claim 12, wherein the step (d) includes:

collecting the intake manifold negative pressure and vehicle deceleration from driving information;

determining the booster decompression rate according to the intake manifold negative pressure and the vehicle deceleration in a virtual brake booster sensor decompression rate control map; and determining a first virtual brake booster sensor value in which the booster decompression rate is subtracted from the virtual brake booster sensor value.

15. The air conditioner cut control method of claim 14, wherein the first virtual brake booster sensor value is determined by subtracting the booster decompression rate times the predetermined system update unit time from the virtual brake booster sensor value.

16. The air conditioner cut control method of claim 12, wherein in the step (e), an A/C CUT reference negative pressure condition is changed according to the virtual brake booster sensor value and an altitude by referring to a variable reference negative pressure setting map, and wherein the reference negative pressure is decreased as the virtual brake booster sensor value is increased, and the reference negative pressure of the A/C CUT standard logic increases as the altitude rises.

17. The air conditioner cut control method of claim 12, wherein in the step (e), a MAX vehicle speed condition of the A/C CUT standard logic is increased at altitudes above a predetermined altitude by referring to a vehicle speed condition change map according to an altitude change condition.

* * * * *